March 31, 1970   KAMEKICHI SHIBA ET AL   3,503,267
METHOD OF MEASURING PHYSICAL QUANTITY
UTILIZING MAGNETIC REPULSION
Filed Jan. 26, 1968   3 Sheets-Sheet 1

INVENTORS
KAMEKICHI SHIBA,
TADASHI ICHINOSE

BY Stevens, Davis, Miller & Mosher
ATTORNEYS

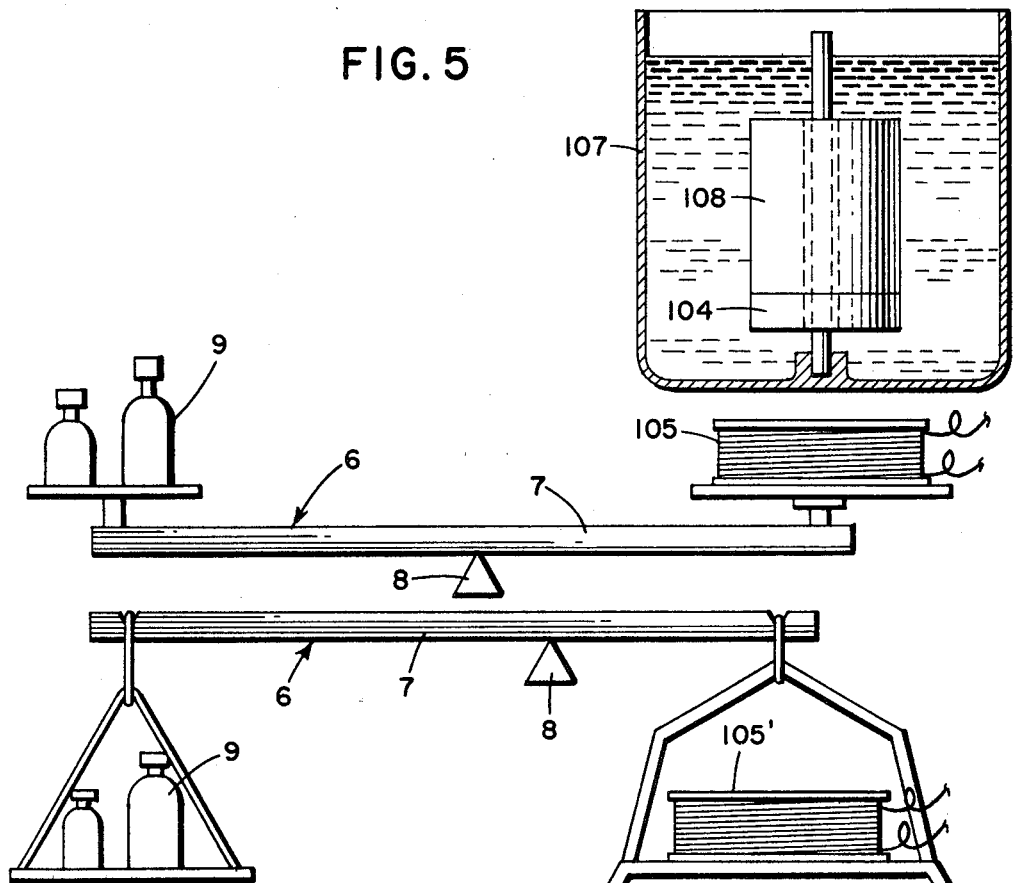
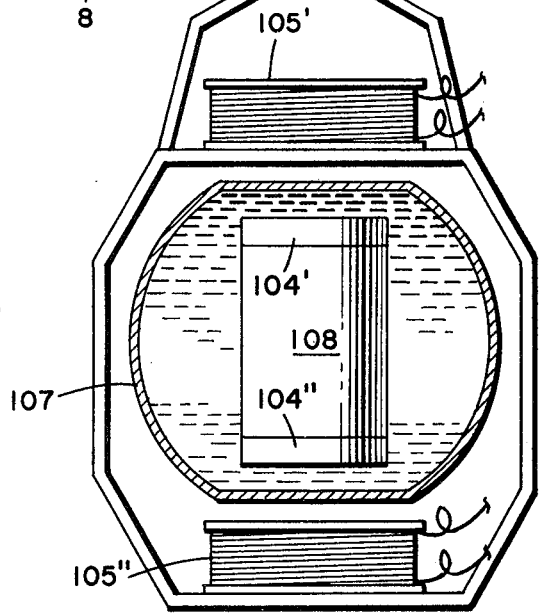

United States Patent Office 3,503,267
Patented Mar. 31, 1970

3,503,267
METHOD OF MEASURING PHYSICAL QUANTITY UTILIZING MAGNETIC REPULSION
Kamekichi Shiba, 159 Kagomachi, Bunkyo-ku, and Tadashi Ichinose, 23 Koenji-1-chome, Suginami-ku, both of Tokyo, Japan
Continuation-in-part of application Ser. No. 298,689, July 30, 1963. This application Jan. 26, 1968, Ser. No. 700,823
Claims priority, application Japan, Aug. 2, 1962, 37/32,263, 37/32,264, 37/32,270
Int. Cl. G01n 9/06
U.S. Cl. 73—434          9 Claims

ABSTRACT OF THE DISCLOSURE

A method and apparatus for determining physical quantities of a fluid by utilizing magnetic repulsion and weighing the apparent change in mass due to the magnetic repulsion. The magnetic repulsion takes place between a first magnetic means mounted on a diaphragm and responsive to the fluid being measured and a second magnetic means associated with a weighing means such as a balance beam.

---

This is a continuation-in-part of application Ser. No. 298,689, filed July 30, 1963, now abandoned.

This invention relates to a method for measuring physical quantities utilizing magnetic repulsion, and more particularly to a method for measuring the density, the pressure difference and the specific gravity of a liquid, by utilizing magnetic repulsion and weighing.

It is well known that the density of a fluid can be determined from the difference between pressures at two points of different heights in the fluid and the distance between these heights. According to the present invention, there is provided a method for measuring the density of a fluid contained in a vessel, comprising counterbalancing a force based upon the pressure difference and a magnetic repulsive force interacting between a magnet mounted on an assembly composed of two diaphragms and a magnet being fixed or movable in a null method condition.

According to the present invention, a force due to the difference between pressures applied to opposite sides of a diaphragm type pressure gauge, having a magnet mounted on one of the diaphragms, is balanced by a magnetic repulsive force produced by current flowing through a coil, and the differential pressure is determined by the measurement either of the magnetic repulsive force or of the current flowing through the coil.

Furthermore, according to the present invention a body having a magnet incorporated thereinto is placed in a liquid, the density of which is to be measured, and electric current is caused to flow through a coil to apply a repulsive force to the body thereby causing it to float within the liquid thus determining the apparent mass of the body in said liquid by measuring the apparent mass of the coil. Finally, the density or specific gravity of the liquid is determined from the apparent mass of the body in the liquid.

The means for accomplishing the foregoing objects and other advantages, which will be apparent to those skilled in the art, are set forth in the following specification and claims, and are illustrated in the accompanying drawings dealing with several embodiments of the present invention. Reference is made now to the drawings in which:

FIG. 5 shows another embodiment of the present invention;

FIG. 6 shows further embodiment; and

Figure 1:
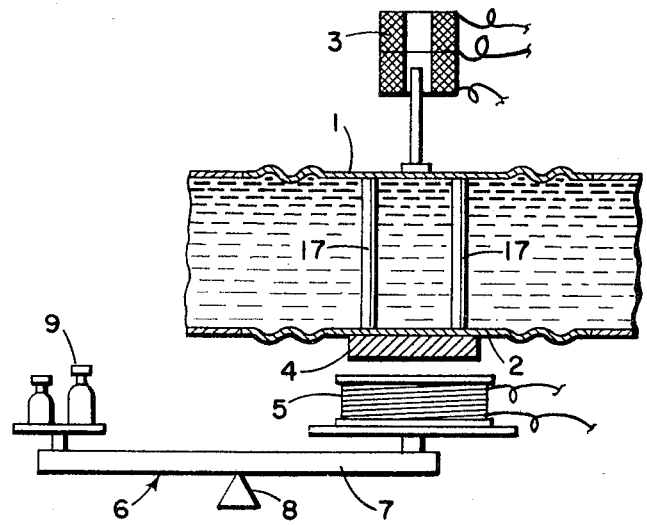
FIG. 1 shows an embodiment of the invention, in which the apparent mass of a coil is measured through a magnetic repulsive force.

Referring to the drawings, in the first embodiment of the present invention, illustrated in FIG. 1, a device utilizing a magnetic repulsive force and the apparent mass of a coil to be measured is employed. A diaphragm 1 is mounted on the upper portion of a tube and carries a disc at its center. A similar diaphragm 2 is also mounted on the lower portion of the tube. The diaphragms 1 and 2 are identical in shape and size and are interconnected so that the distance between them is maintained invariant. This interconnection may be effected either by posts disposed within the fluid or by a frame outside the tube. In the illustrated embodiment, the diaphragms are interconnected through two posts 17. A differential transformer 3 is arranged for detecting the displacement of the assembly of diaphragms 1 and 2. A magnet 4 is mounted on the lower diaphragm 2. A coil 5 is disposed below the magnet 4 on a balance beam 6. Current flowing through the coil 5 produces a repulsive force between magnets 4 and 5. The balance beam weighing device 6 having a beam 7, fulcrum 8 and weights 9 is provided to measure the apparent mass of the coil 5.

In place of the diaphragms, a bellows may be used. Since the diaphragms 1 and 2 are to be subjected to pressure, it is unnecessary for them to be mounted on the tube itself. Additional diaphragms disposed on the same level as the diaphragms 1 and 2 and in a side tube communicating with said tube may be used. Since the assembly of diaphragms 1 and 2 is subjected to a pressure difference, the quantity directly obtained from the measurement of the apparent mass of the coil is the pressure difference and not the mass of the liquid.

Figure 7:
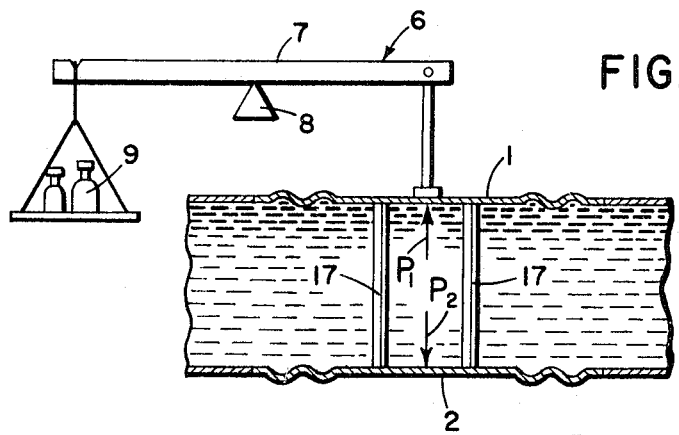
FIG. 7 is a diagram for explanation of the operation of the invention.

The density measuring process utilizing the above mentioned embodiments will now be described with reference to FIG. 7. The apparent mass of an assembly of diaphragms 1 and 2 and posts 17 to be weighed by a balance 6 is assumed to be $m_0$. When the tube contains a fluid, an upward pressure $P_1$ and a downward pressure $P_2$ are applied to the diaphragms 1 and 2, respectively, and hence the force applied to the assembly of 1 and 2 amounts to $(P_2-P_1)S$ downwards. Here S represents the effective area of each of the diaphragms 1 and 2 (the area of the diaphragm minus the cross-sectional area of the posts). If the distance between the diaphragms 1 and 2, that is the difference in the height, is $h$, then $$(P_2-P_1)S=\rho S h g$$

where $\rho$ is density of the fluid and $g$ the gravitational acceleration.

When a downward force is applied to the assembly of 1 and 2, the apparent mass of the assembly is greater than its true value. If the apparent mass is represented by $m$, $(m-m_0)$ denotes a mass corresponding to the downward force. Therefore, $$(m-m_0)g=(P_2-P_1)S=\rho S h g$$

and $$\rho=\frac{1}{Sh}(m-m_0)$$

Thus, the density of the fluid can be determined by the measurement of $(m-m_0)$.

With the first embodiment shown in FIG. 1, the measurement is carried out in the way described hereafter. The null position of the assembly of 1 and 2 is assumed to be the position where the midpoint of the distance between diaphragms 1 and 2 is coincident with the center axis of the tube. The differential transformer 3 is arranged for detecting the position of the assembly of 1 and 2.

If no current flows through the coil 5 when the tube does not contain any fluid, the assembly of 1 and 2 is below its null position due to gravity. When current flows through the coil 5 to apply a repulsive force to the assembly of 1 and 2, the assembly moves upwards. When the assembly of 1 and 2 has been brought to its null position by properly adjusting the current flowing through the coil 5, the apparent mass of the coil 5 is taken by balance beam 6 as $M+m_0$ where M is the mass of the coil. Then, $m-m_0$ corresponds to $m-m_0$ for the example of FIG. 7. On the other hand when the tube contains fluid and the current flowing through the coil 5 is adjusted so that the assembly is again brought to its null position by balance beam 6 and the apparent mass of the coil 5 is taken as $M+m$.

Further, according to the present invention, a diaphragm carrying a magnet of a diaphragm pressure gauge and at least one coil are used as described above, but various alternate embodiments may be practiced. Although the diaphragm may be either of a metal sheet of a plastic membrane, a corrugated sheet is used in the illustrated embodiments. Means for precisely detecting the displacement of the center of the diaphragm is also required. A differential transformer, micrometer or the like may be employed as such means. In the illustrated embodiments a differential transformer is used.

Figure 2:
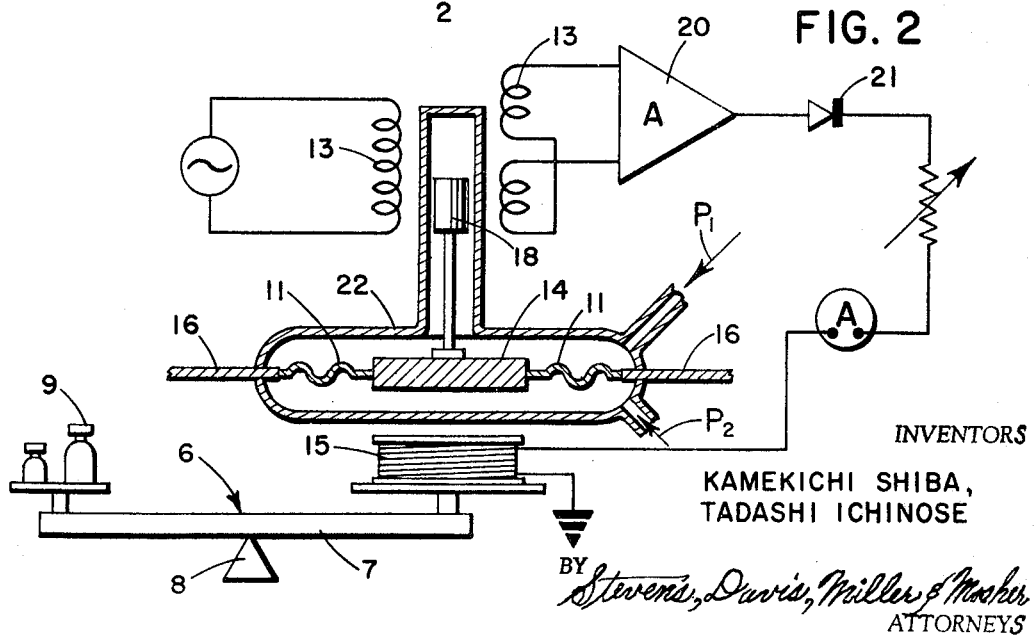
FIG. 2 shows an embodiment of the present invention wherein a magnet is carried on a diaphragm of a diaphragm pressure gauge and only one coil is employed.

Referring to FIG. 2 illustrating the second embodiment of the present invention, a fixed diaphragm 11 is extended horizontally across a fixed frame 16 and a magnet 14 and a movable core 18 of a differential transformer 13 are mounted on the diaphragm. A coil 15 is arranged below and outside a pressure chamber 22 so that its mass may be measured by balance beam 7. A coil of the differential transformer 13 is disposed outside the pressure chamber. Pressures of $P_1$ and $P_2$ are applied to the upper and lower surface of the diaphragm, respectively, and the difference $P_1-P_2$ can be measured.

Referring to FIG. 2 at first (when no pressure is exerted on the magnet 14) the magnet 14 is displaced downward slightly by gravity from the position in the horizontal plane defined by the frame 16, which in turn causes the core 18 of the differential transformer 13 to be displaced downward the same amount as the displacement of the magnet from the balanced position. As a result, an output proportional to the displacement of the core 18 and hence the magnet 14, from the differential transformer is fed to the coil 15 (usually in the form of electromagnet), resulting in a downward displacement of the coil 15 due to the developed repulsive force between the coil 15 and the magnet 14. Then, the balance beam 7 is balanced, that is, the beam 7 is brought to the horizontal attitude by adjusting the weights 9. Thus, the apparent mass of the coil 15 when no pressure is applied to the magnet 14 is measured. Next, when pressures $P_1$ and $P_2$ are exerted on the magnet 14 on respective sides, the magnet 14 is displaced by an amount corresponding to the difference of the pressures, resulting in another displacement of the coil 15 in a similar manner to that stated above. Then, again balancing the balance beam 7 by again adjusting the weights 9, the apparent mass of the coil 15 when the difference pressure is exerted on the magnet 14 is measured. Thus, the difference of the apparent masses of the coil 15 (or readings of the current meter, if the meter is inserted in the circuit) when no pressure is exerted on the magnet and when the difference pressure is exerted on the magnet represents the pressure difference.

If the method of reading the current by means of the meter is employed, it is convenient to fix the coil 15.

FIG. 2 includes an example of measuring in which the output of the differential amplifier is fed to coil 15 after being amplified and rectified by amplifier 20 and rectifier 21 respectively. It was previously stated that balance beam 6 is initially balanced when $P_1=P_2$. When $P_1 \neq P_2$, then magnet 14 and core 18 are displaced and the differential amplifier 13 will deliver an output proportional to the displacement of magnet 14, the output being fed to coil 15. Coil 15 will thus be displaced in response to the displacement of magnet 14. The balance beam 7 is again balanced by appropriate adjustment of the weights 9 to measure the apparent mass of the coil 15. At this time, the position of the magnet 14 is approximately at its original position, i.e., level with frame 16; however, it has been necessary to energize coil 15 by the amplified output of the differential transformer to exercise a repulsive force to support magnet 14. The difference between the final apparent mass of coil 15 and its initial mass equals the difference between $P_1$ and $P_2$. As an alternative, the output current of the differential transformer can be measured at this time to determine pressure difference.

Figure 3:
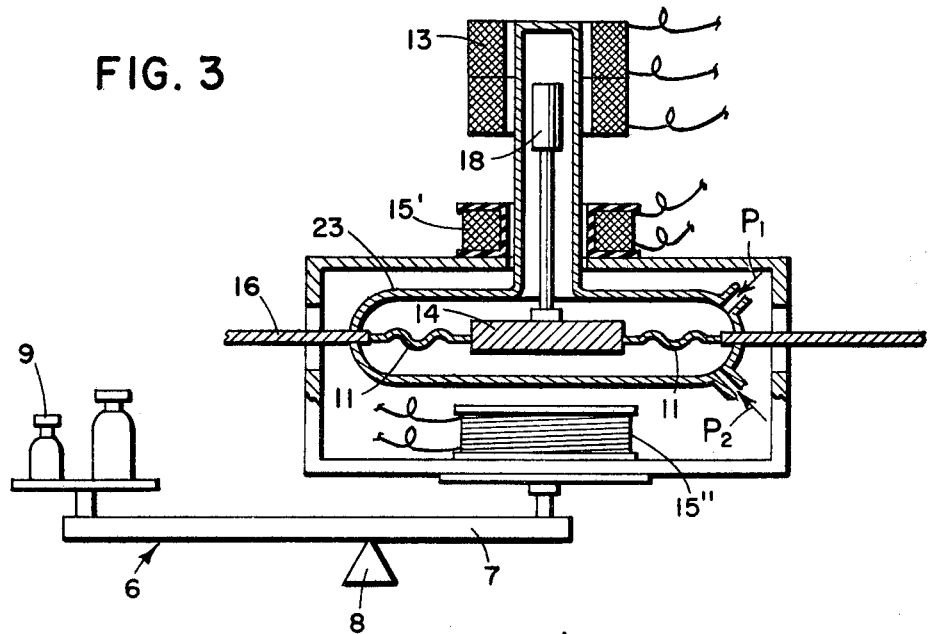
FIG. 3 shows another embodiment wherein two magnets are employed.

Referring to FIG. 3 illustrating a third embodiment of the present invention, a horizontally disposed diaphragm is used similarly to the second embodiment shown in FIG. 2 but two coils 15' and 15" are used. One of the coils 15' is arranged above the pressure chamber 23 and the other coil 15" is arranged below the pressure chamber. These two coils are interconnected so that the sum of their masses may be measured by means of balance 6.

Figure 4:
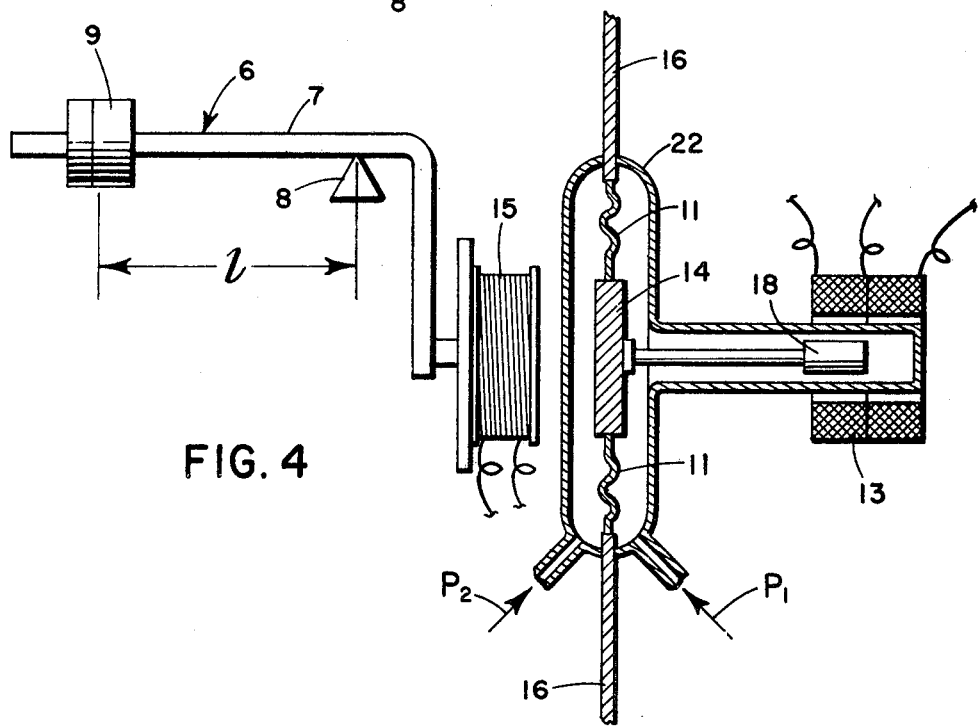
FIG. 4 shows still another embodiment wherein a diaphragm is arranged in a vertical plane and only one coil is employed.

Referring to FIG. 4 illustrating a fourth embodiment of the present invention, the diaphragm 11 is disposed in a vertical plane. Similarly to FIG. 2, the diaphragm 11 is extended across a frame 16 and carries a magnet 14. A coil 15 and a differential transformer 13 are also employed in this case. A balance for measuring the mass of the coil 15 has a fulcrum 8 and weights 9.

The measuring process using the present device will now be described in detail.

In the second embodiment shown in FIG. 2, the position of the diaphragm 11 carrying the magnet 14 depends on the pressure difference $P_1-P_2$. When a pressure difference $P_1-P_2$ does not exist and no current is flowing through the coil 15, the diaphragm 11 is below the horizontal plane defined by the frame 16 owing to its own weight. When a current is caused to flow through the coil 15 to apply a repulsive force to the magnet 14, the diaphragm 11 shifts upward under the influence of the repulsive force. By properly adjusting the current, the diaphragm is positioned in the same horizontal plane as the frame 16. The apparent mass of the coil 15 at this time is taken as $M+m_0$, where M is the mass of the coil 15 per se.

If the pressure difference $P_1-P_2$ changes from zero and the current is still maintained, the position of the diaphragm will change. The diaphragm is caused to return to its original position by properly adjusting the current flowing through the coil 15.

The apparent mass of the coil 15 at this time is taken as $M+m$. The pressure difference $P_1-P_2$ is proportional to $m-m_0$. By experimentally predetermining the proportionality constant, the pressure difference $P_1-P_2$ can be determined by measuring the apparent mass of the coil 15.

In the third embodiment illustrated in FIG. 3, when $P_1-P_2=0$, and the current flowing through the coils 15' and 15" is also zero, the diaphragm 11 carrying the magnet 14 is below the fixed frame 16. When currents of $I_{10}$ and $I_{20}$ flow through the coils 15' and 15", respectively, and the diaphragm 11 is brought into the same horizontal plane as the frame 16 the apparent mass of the combination of the coils 15' and 15" is taken as $M+m_0$ where M is the mass of the assembly of coils 15' and 15". Then, when $P_1-P_2>0$, currents of $I_1$ and $I_2$ flow through the coils 15′ and 15″, respectively, and the diaphragm 11 is brought into the same horizontal plane as the frame 16 the apparent mass of the combination of the coils 15′ and 15″ is taken as $M+m$ and $(m-m_0)g$ is in equilibrium with the force applied to the diaphragm due to the pressure difference $P_1-P_2$. Accordingly, the pressure difference is determined by measuring the apparent mass $m-m_0$. In this case, the current flowing through the coils 15″ may differ from that flowing through the coil 15′, or number of turns of the coil 15″ may be made suitably greater than that of the coil 15′ and the two coils may be connected in series.

Measurement by the fourth embodiment shown in FIG. 4 is carried out in the manner described herebelow. The arrangement is made such that the diaphragm 11 is in the same vertical plane as the fixed frame 16 and the arm 7 of the balance 6 extends horizontally, when $P_1-P_2=0$, and no current flows through the coil 15 displacing the weight 9. Then, when $P_1-P_2>0$, current is caused to flow through the coil 15 and the weight 9 is employed to return the diaphragm to its original position and make the arm of the balance extend horizontal. If the distance between the fulcrum 8 of the balance and the weight 9 is $l$, the different pressure is proportional to $l$. Thus, $P_1-P_2=kl$. By predetermining the value of the proportional constant $k$ experimentally, the differential pressure $P_1-P_2$ can be determined by measuring $l$.

Furthermore, referring to FIG. 5 illustrating the fifth embodiment of the present invention, a liquid, the density of which is to be measured, is placed within a vessel 107 which is made of a nonmagnetic material, and a body 108, having a magnet 104 incorporated therein, is placed in the liquid. Since the mean bulk specific gravity of the body 108 is so selected as to be greater than that of the liquid, the body 108 sinks to the bottom of the vessel 107. Below the body 108, beyond the bottom of the vessel 107, there is a coil 105 through which direct current flows. The flow of the DC current is selected so that the coil 105 applies repulsive force to the magnet 104. A balance is arranged to measure the mass of the coil 105.

When a current of sufficient magnitude flows through the coil 105, the body will float owing to the repulsive force. FIG. 5 shows the body 108 floating in the liquid.

Provision is made to cause the body 108 to travel only vertically up and down. For example, the body 108 is provided with a cylindrical through bore 109 through which extends post 110 fixed to the vessel 107.

The sixth embodiment shown in FIG. 6 differs in construction from the above fifth embodiment. The vessel 107 containing a liquid in this embodiment has an upper wall. A body 108 within the vessel has magnets 104′ and 104″ incorporated into the upper and lower portion of the body 108, respectively. Coils 105′ and 105″ are disposed externally above and below the vessel 107, respectively. These coils are interconnected mechanically so that their total mass may be measured. A current flows through the coils 105′ and 105″ in such direction as to apply repulsive forces to the magnets 104′ and 104″, respectively. By making the number of turns of the coil 105″ appropriately greater than that of the coil 105′, the body 108 will float away from the bottom of the vessel when the current exceeds a certain value. FIG. 6 shows the body 108 floating in the liquid. The body 108 is permitted to move only vertically up and down.

The principle of the present method of measurement will now be explained. In the fifth embodiment, the magnetic field is not uniform when a current of constant magnitude flows through the coil 105 and the repulsive force diminishes as the magnet 104 moves away from the coil 105. At a given position the repulsive force is proportionate to the current $I$ flowing through the coil 105. Although the body 108 (including the magnet 104) sinks to the bottom of the vessel 107 when no current flows through the coil 105, the upward force applied by the coil 105 increases with the current and when the current exceeds a certain value the body 108 will float in the liquid away from the bottom. The upward force (the repulsive force applied by the coil 105), however, falls off as the body moves upward and an equilibrium condition is obtained at some point. This equilibrium point depends upon the current $I$ when the liquid and the body remain unchanged. As the current $I$ increases above a certain value, the upper end of the body 108 will float beyond the surface of the liquid into the atmosphere.

If the current $I$ is within a certain range, the whole of the body 108 will float within the liquid. The measurement must be carried out under such a condition. In this case, the body 108 is in equilibrium under the actions of gravity, buoyancy and the magnetic (repulsive) force. In other words, the difference between gravity and buoyancy is counterbalanced by the magnetic force.

As the magnetic force is due to the interaction between the magnet 104 and the coil 105, a force of equal magnitude and of opposite direction is applied to the coil 105 from the magnet 104. Accordingly, the apparent mass of the coil 105, as measured by the balance, is the sum of the mass of the coil 105 itself and a mass corresponding to the repulsive force. The proper mass of the coil 105 can be determined by measuring when no current is flowing through the coil. Accordingly, the difference of the apparent mass and the proper mass of the coil represents the repulsive force.

The mass corresponding to the repulsive force is equal to the apparent mass $m'$ of the body 108 in the liquid. If we take the mass of the body, its density and the density of the liquid as $m$, $\rho$ and $\rho e$, respectively, $$m' = m\left(1 - \frac{\rho_e}{\rho}\right)$$

If $m$ and $\rho$ are known, by measuring $m'$ the density of the liquid can be determined.

Since the body 108 need not be at the predetermined original position, means for sensing the position of the body 108 is unnecessary. The measurement of density can be carried out by maintaining the current $I$ through the coil 105 constant, and hence the coil 105 can be replaced by a permanent magnet. The change of the intensity of the current through the coil 105 of the permanent magnet results in only the change of the range of measurable density.

Referring to FIG. 6 illustrating the sixth embodiment of the present invention, the body 108 sinks to the bottom of the vessel when no current flows through the coils 105′ and 105″. When current flows, a downward force is applied to the body 108 by the coil 105′ and an upward force is applied to the body 108 by the coil 105″. The arrangement is such that when the body 108 is on the bottom of the vessel the upward force is stronger than the downward force. Thus the difference between the upward and downward forces increases in proportion to the current $I$ and with the force greater than a certain limit the body 108 floats away from the bottom of the vessel. But the current may be increased to the extent that the body 108 does not contact the upper wall of the vessel. In such an equilibrium state, the body 108 is in equilibrium under the actions of gravity, buoyancy and the magnetic force applied by the coils 105′ and 105″. In other words, the sum of repulsive forces applied by the two coils 105′ and 105″ is counterbalanced by the difference between the gravity and buoyancy.

Since the reaction of the repulsive force applied by the coils 105′ and 105″ is applied to the coils themselves, the difference between the apparent mass of the two coils and the proper mass thereof represents the apparent mass of the body 108 in the liquid. Therefore, the density $\rho$ of the liquid can be obtained in the same way as in the case described previously.

By employing two coils, a wider range of density can be measured as compared with employing one coil, and moreover, even a liquid having a density greater than the bulk density of the body 108 can be measured.

As described above, the present invention has many advantages as follows:

(a) The density of the fluid within the tube can be measured outside the tube.

(b) Measurement can be carried out without seriously affecting the flow of the fluid in the tube. This fact is clear when the diaphragms 1 and 2 are interconnected by means of a frame disposed outside the tube.

(c) Continuous measurement can be carried out and the device can be utilized for signalling for automatic control.

Further, as apparent from the foregoing, the method for measuring the pressure difference according to the present invention has many advantages as follows:

(a) High precision measurement of the pressure difference can be carried out.

(b) Since the present method is based upon so-called null method, it is not adversely affected by resiliency of the diaphragm and hence by temperature.

(c) Measurement of the pressure difference may be carried out outside a hermetically sealed vessel.

(d) If a differential transformer is arranged to automatically adjust the current flowing through the coil or coils, the differential pressure can be measured continuously as well as utilized for signalling for automatic control.

Furthermore, the present invention has many advantages as follows:

(a) Density can be determined by measurement outside the vessel.

(b) The measurement according to the present method is not influenced by surface tension.

(c) It is highly precise as the method is basically measurement of mass.

(d) For the same reason, continuous measurement and automatic recording can be carried out, and furthermore the present method can be utilized for signalling during automatic control.

(e) If the body 108 floats perfectly in the liquid and is in equilibrium, the measurement does not depend on the position of the body 108 or the strength of the current.

It should be clearly understood that while specific embodiments of the invention are illustrated, such illustration does not limit the spirit and scope of the invention as set forth in the accompanying claims.

What is claimed:

1. A method of measuring the density of a fluid within a container provided with two equal area diaphragms horizontally spaced at different heights in said container with the centers thereof being on the same vertical line, comprising the steps of balancing an electromagnet mounted below and outside of said container, passing an electric current through said electromagnet and controlling said electric current to bring said diaphragm to a reference position by the magnetic repulsive force between a magnet attached to the lower of said diaphragms and said electromagnet, and weighing the apparent mass of said electromagnet to thereby determine the difference between the pressures applied to said diaphragms by said fluid due to the fluid height to determine the density of the fluid from said pressure difference.

2. A method for measuring the pressure difference exerted on opposite sides of a diaphragm dividing a chamber into two compartments, a magnet being attached to said diaphragm and an electromagnet mounted outside said chamber and on the low pressure side of said diaphragm comprising the steps of energizing said electromagnet to create a repulsive force between said magnet and said electromagnet, when the latter is energized, and weighing the apparent mass of said elctromagnet while controlling the electric current flow through said electromagnet according to the displacement of said magnet.

3. A method for measuring pressure difference in a chamber divided into two compartments by a diaphragm having a magnet attached thereto, comprising the steps of exerting pressures, the difference of which is to be measured, on opposite sides of said diaphragm, generating an electrical current proportional to the displacement of said diaphragm by said pressure difference, feeding said current to an electromagnet movably mounted outside said chamber and on the low pressure side of said diaphragm to create a repulsive force between said magnet and said electromagnet to cause the former to return to its initial position, and measuring the repulsive force.

4. A method for measuring pressure difference according to claim 3 in which the effective mass of said electromagnet is weighed on a balance beam.

5. A method for measuring pressure difference according to claim 3 in which said measurement is effected by measuring the current fed to said electromagnet.

6. An apparatus for measuring pressure difference comprising a container, a diaphragm mounted within said container to define two compartments therein, magnetic means mounted on said diaphragm, at least one electromagnet movably mounted outside said container to exert a magnetic repulsive force on said magnet when the former is energized, one of said at least one electromagnet being disposed on the low pressure side of said diaphragm, means for detecting the displacement of said diaphragm due to said pressure difference and to generate an electrical output proportional to said displacement, means for bringing said electromagnet back to the original position thereof, and means for measuring the force necessary for bringing said electromagnet back to said original position.

7. An apparatus according to claim 6 in which said means for bringing said electromagnet back to said original position and said means for measuring said force are a balance beam.

8. An apparatus according to claim 6 in which said means for measuring said force is an electrometer measuring the current fed to said electromagnet.

9. An apparatus for measuring density of a fluid in a container by counterbalancing a force based upon said density by a magnetic repulsive force comprising a container, at least two diaphragms mounted in opposing, spaced, horizontal relationship on the upper and lower sides of said container, means interconnecting said diaphragms to keep the distance therebetween invariant, magnet means attached to the lower of said diaphragms, an electromagnet mounted exteriorly of said container and closely adjacent said magnet means to exert a repulsive force thereon, means for controlling an electric current passing through said electromagnet to bring said diaphragms to a reference position, and means to measure said repulsive force.

References Cited

UNITED STATES PATENTS

| 2,630,559 | 3/1953 | Whittier | 73—407 |
| 2,635,461 | 4/1953 | Groth et al. | 73—434 |

FOREIGN PATENTS 142,073   10/1961   U.S.S.R.

RICHARD C. QUEISSER, Primary Examiner

JOHN K. LUNSFORD, Assistant Examiner

U.S. Cl. X.R.

73—32, 406